United States Patent [19]

Gammon

[11] Patent Number: 5,176,210
[45] Date of Patent: Jan. 5, 1993

[54] THERMOCHEMICAL ICE MELTING

[75] Inventor: Peter H. F. Gammon, St. John's, Canada

[73] Assignee: Arctic Systems Limited, St. John's, Canada

[21] Appl. No.: 717,209

[22] Filed: Jun. 18, 1991

Related U.S. Application Data

[63] Continuation-in-part of Ser. No. 549,154, Jul. 6, 1990.

[51] Int. Cl.⁵ ............................................. F25C 5/04
[52] U.S. Cl. ......................................... 175/18; 299/3
[58] Field of Search ...................... 175/18; 299/3, 24

[56] References Cited

U.S. PATENT DOCUMENTS 2,466,773  4/1949  Kestenbaum et al. ............. 299/3 X
4,651,834  3/1987  Eninger et al. ..................... 175/18
4,923,019  5/1990  Gammon ........................... 175/18 X Primary Examiner—William P. Neuder
Attorney, Agent, or Firm—Fish & Richardson

[57] ABSTRACT

A method is described for melting ice, e.g. for penetrating ice, snow, frozen soils and other low melting solid materials where frozen water is a principal constituent. It comprises directly contacting the material to be melted with a melting agent comprising at least one compound selected from the hydroxides, monoxides, methoxides and amides of the alkali metals, lithium, sodium, potassium, rubidium and cesium. Mixtures of at least two of these compounds are preferably used to form ice melting compositions of specific characteristics.

33 Claims, No Drawings

THERMOCHEMICAL ICE MELTING

BACKGROUND OF THE INVENTION

This invention relates to a method for penetrating ice, snow, frozen soils and other low melting solid materials, and more particularly a method for thermochemical ice melting. It is a continuation-in-part of application Ser. No. 07/549,154, filed Jul. 6, 1990.

There are many situations in cold climates where it is desirable to penetrate ice or snow cover. For instance, a small hole may be drilled through an ice sheet to determine the thickness of the sheet. It may also be desirable to penetrate an ice sheet for the purpose of carrying electrical, electronic, acoustic, or electro-acoustic instrumentation into the ice or into the water beneath the ice sheet. It may, furthermore, be desirable to provide holes in an ice sheet for the attachment of anchors to anchor instrumentation packages, aircraft, light structures, etc. to ice or frozen soil. Also, it may be necessary to penetrate snow to reach the underlying ice.

Thermal drilling using steam or hot water is a well-tried and effective method for drilling holes in ice. However, thermal drilling typically requires boilers and pumps of substantial size and weight together with cumbersome insulation around delivery lines. Thus, such a system is not adaptable to the production of a compact, autonomous penetrator required for deployment of small instrument packages, particularly when such packages are deployed by dropping from an aircraft.

Similarly, mechanical ice penetration devices, e.g. drills, augers, etc., tend to be difficult to engineer and unwieldy for use in autonomous or air-dropped applications.

It is also known to use thermochemical reactions for penetrating ice. One such system is described in Delgendre et al, Canadian Patent 977,737, issued Nov. 11, 1975. That patent shows a reactor tube containing a solid propellant which is ignited to produce a hot gas which is then directed against the ice through an outlet.

Ward, Canadian Patent 969,168, issued Jun. 10, 1975 describes another thermochemical ice penetrating device. It is typically a spherical body having a core formed of a high specific gravity substantially water-inert solid material, e.g. iron, steel or lead, and a shell surrounding the core which includes a chemical which has a highly exothermic reaction with water, e.g. lithium or sodium. This can be dropped onto an ice surface and penetrates into the ice by thermochemical activity and the weight of the sphere.

Eninger et al, U.S. Pat. No. 4,651,834 issued Mar. 24, 1987 describes another form of ice penetrating device in which the penetrator is in the form of an elongated body containing a solid mass of reactant which reacts with water and thereby melts and penetrates the ice. With this system, the reactant mass is consumed lengthwise of the body by its reaction with water, such that the maximum penetration distance of the device through the ice is determined by the length of reactant mass within the penetrator.

The above U.S. Pat. No. 4,651,834 and Canadian Patent 969,168 both describe what is generally known as a "contact" ice melting system in which the thermochemical agent is in direct contact with the ice being melted. The preferred thermochemical agents identified in the prior art for contact ice melting are alkali metals or alloys containing alkali metals. The preferred alkali metal is lithium. However, lithium has a major disadvantage as a contact ice melting thermochemical in that its density is only half that of water. Furthermore, it provides only a relatively slow penetration rate of about 2–5 cm/minute and it will not start reacting with ice at temperatures much below freezing. Also, it gives off a flammable gas as it dissolves, making it unsafe to carry in aircraft.

Gammon, U.S. Pat. No. 4,923,019, issued May 8, 1990 describes a thermochemical ice penetrator having a confined thermochemical reaction chamber formed within a body and containing a substantially immobilized first thermochemical reactant. The chamber has an inlet and an outlet. An aqueous second thermochemical reactant is fed through the inlet into the chamber and a hot thermochemical reaction product including hot aqueous fluid and/or steam is discharged through the outlet and into contact with the ice to be melted and penetrated. Thus, it functions as a "fluid transfer penetrator" and not as a contact penetrator. This system has the advantage that the reaction occurs in a controlled, thermally isolated environment.

Fluid transfer penetrators can be used in a wide range of applications. However, there are many instances in which a fluid transfer system is unsuitable and a contact ice melting system is preferred. Often, combinations of the two systems can perform where either system alone would be unsatisfactory.

It is an object of the present invention to provide a method for melting ice by direct contact in which a high performance thermochemical melting agent is used which has the ability to efficiently melt ice and snow at very rapid rates.

SUMMARY OF THE INVENTION

The present invention relates to a thermochemical ice melting process which comprises directly contacting the ice to be melted with a melting agent comprising a compound selected from the hydroxides, monoxides, methoxides and amides of the alkali metals, lithium, sodium, potassium, rubidium and cesium and mixtures of two or more of these compounds. The term "ice" as used herein includes any low melting solid material having frozen water as a significant component, e.g. solid ice, snow, broken ice, crushed ice, frozen soils, etc.

The melting compounds of the present invention can be more explicitly defined as follows:

A. Lithium hydroxide (LiOH), lithium monoxide (Li$_2$O), lithium methoxide (LiOCH$_3$), lithium amide (LiNH$_2$).

B. Sodium hydroxide (NaOH), sodium monoxide (Na$_2$O), sodium methoxide (NaOCH$_3$), sodium amide (NaNH$_2$).

C. Potassium hydroxide (KOH), potassium monoxide (K$_2$O), potassium methoxide (KOCH$_3$), potassium amide (KNH$_2$).

D. Rubidium hydroxide (RbOH), rubidium monoxide (Rb$_2$O), rubidium methoxide (RbOCH$_3$), rubidium amide (RbNH$_2$).

E. Cesium hydroxide (CsOH), cesium monoxide (Cs$_2$O), cesium methoxide (CsOCH$_3$), cesium amide (CsNH$_2$).

All of the above individual compounds react with water. There are four general reactions depending on the anion. These are:

—ROH→ROH$_{(aq)}$+heat

—R$_2$O+H$_2$O→2 ROH$_{(aq)}$+heat

—$ROCH_3 + H_2O \rightarrow ROH_{(aq)} + CH_3OH_{(aq)} +$ heat
—$RNH_2 + H_2O \rightarrow ROH_{(aq)} + NH_{3(aq)} +$ heat In the above reactions, R denotes one of Li, Na, K, Rb or Cs. A feature of these reactions is that they all have in common the production of dissolved alkali hydroxide as a principal reaction product. Other reaction products (methanol or ammonia) are extremely water soluble at the temperatures normally associated with aqueous reactions (0° to 100° C).

While all of the above individual compounds may react exothermically with water at some temperature, some of them react only very slowly or not at all with ice or very cold water. For this reason, the lithium compounds are not useful individually as ice melting agents. For instance, lithium hydroxide has a very low solubility in water and the dissolution of lithium hydroxide generates insufficient heat to melt the necessary amount of water for the reaction to proceed. It has been observed that lithium hydroxide does not dissolve appreciably when brought into contact with ice even under optimal conditions with the ice at its melting temperature of 0° C. It has also been found that sodium hydroxide is of limited value when used alone because it does not appear to be capable of sustaining the melting action in ice after a short initial period.

Other individual ice melting compounds, such as cesium amide, are not suitable for use alone because they are so highly reactive that they may explode even upon coming into contact with ice.

However, all of the above compounds are useful as components of melting agent mixtures of the present invention. Thus, it has been found that mixtures of the individual components are generally more useful as ice melting agents than are the individual compounds themselves. All of the above compounds have been found to be compatible in mixtures and, therefore, arbitrary mixtures can be made of the form:

$$a_1C_1 + a_2C_2 + \ldots + a_{20}C_{20}$$

where $C_i$ is any compound from the group and the fractional (proportion by weight) coefficients $a_i$ can lie arbitrarily in the range $0 \leq a_i \leq 1$, $\Sigma_i a_i = 1$. Such mixtures are formed by stirring and compacting powders in the appropriate ratio or by fusing the components together. No significant chemical reaction (i.e. no significant evolution of heat, precipitate or gas) occurs when the compounds are mixed or fused. Aqueous solutions of mixtures of the compounds are indistinguishable from mixtures of the aqueous solutions of the individual compounds. It is the mutual compatibility of all of the specific compounds which makes the group of compounds as a whole so useful for specialized ice melting applications.

The individual melting agents mentioned above have been found to have very different reaction characteristics and an important feature of the present invention is the mixing of the melting agents of different characteristics to form blended products of predetermined reaction characteristics for specific applications. It has also been found that sodium monoxide is particularly effective when used alone.

The process of the invention may typically be used in any of the following specific applications:

(a) Initiating Melting Reaction With Ice at Arctic Temperatures

Members of the inventive group of ice melting compounds have unique capabilities to start rapidly melting ice upon contact when both ice and thermochemical are cooled to temperatures far below freezing. This initiation action is important in providing the initial fluid on which some types of fluid transfer penetrators as described in U.S. Pat. No. 4,923,019 can operate. Furthermore, slow-acting thermochemicals such as lithium metal, which will not commence reacting with ice at temperatures much below freezing can be "started" at Arctic temperatures with a small amount of initiator compound selected from the inventive group. Compounds and mixtures from the inventive group can start rapid exothermic reactions with ice at temperatures lower than $-60°$ C. (e.g. using $CsNH_2$).

(b) Penetrating Ice

Every compound in the present invention (and all mixtures) is denser than water and will sink in a meltwater pool as melting proceeds. Most of the compounds melt ice extremely rapidly. Their action is unhindered by precipitation of insoluble reaction products or by the evolution of insoluble gas which can lift the thermochemical up away from the ice/water interface, reducing melting efficiency. The compounds of the invention tend to penetrate ice efficiently, making deep narrow holes and utilizing a large fraction of available heat energy for useful downward melting. Many of the compounds and mixtures of the invention are so reactive that they can sustain a boiling reaction in the immediate environment of a chunk of thermochemical lying on ice at the bottom of a crater filled with cooled meltwater. Speeds of penetration of up to 1 cm per second can be obtained with such boiling reactions. These speeds are far higher than can be achieved with less reactive thermochemicals like lithium metal, and speed of penetration can be extremely important in many applications.

(c) Penetrating Snow

Compounds in the invention and mixtures of these compounds have been found to be highly efficient at melting through snow and crushed ice. In melting snow, meltwater tends to drain downward or soak into the snow and does not pool around the thermochemical charge. Thus, melting action is localized exclusively to the bottom surface of the charge which is in direct contact with the snow or ice being penetrated. Under these conditions, many thermochemicals will freeze in and cease to penetrate. However, the formulations of this invention penetrate extremely rapidly and a small charge will melt through a large thickness of snow. The very high solubility and water reactivity of the compounds makes this action possible. Penetrators used to determine snow cover thickness or to deploy instruments onto ice cover beneath snow can be made from the compounds and mixtures of this invention.

(d) Establishing Acoustic or Mechanical Contact With Ice

Some payloads deployed over Arctic ice cover may contain instruments which need to be acoustically or mechanically coupled to the ice cover. For example an ice thickness measuring device using an acoustic pulse to determine thickness would need to be acoustically coupled to the ice cover. Such coupling can rapidly be achieved by penetrating any snow cover present and then melting a shallow depression in the surface of the ice and deploying the acoustic sensor in the meltwater pool. The sensor is then acoustically coupled to the meltwater which in turn is coupled to the ice. The highly reactive and soluble chemicals of the invention are ideally suited to this application.

(e) Orienting an Autonomous Ice Penetrator

When an ice penetrator/payload package is aerially deployed (as for military reconnaissance operations in the Arctic) the package will often be configured such that it lies broadside on the ice after impact. Such packages are usually cylindrical with length much exceeding diameter owing to constraints imposed by standardized launch tubes etc. To efficiently penetrate ice, an autonomous penetrator must "stand on end," thereby presenting a minimum cross-sectional area (hence volume of ice) to be penetrated. Thermochemical "righting" charges composed of mixtures of dense chemicals from the group of the invention can be used to ballast the front end of the penetrator assembly such that the assembly tips rapidly to a vertical orientation as melting proceeds. The action is simple. A block of dense fast melting thermochemical is rigidly attached ahead of the center of gravity of an elongated cylindrical ice penetrator package. Rapid melting under the heavy front end occurs causing the whole package to tip vertically into the resulting crater in the ice. This action is highly beneficial in simplifying the design and operation of autonomous downward ice penetrators.

There are a number of advantages in the method of the present invention over the prior art. Thus, the melting agents of this invention tend to be very strongly water reactive. They start melting ice at very low temperatures, they melt ice very fast and they melt a large amount of ice per unit volume of chemical used. The melting agents of the invention are all compounds and mixtures which react with water/ice without effervescence. This increases efficiency and rate of melting. The lack of flammable effervescence is an important safety advantage.

The melting agents of the invention are all of low chronic toxicity and are of low acute intrinsic toxicity when diluted in water. Apart from the high pH value of their aqueous solutions, the materials are environmentally quite benign.

The different melting agents of the invention can be formulated to undergo controlled reactions with water with rates and energies continuously variable over a large range.

As an example of the great versatility and hence usefulness of the present invention, it should be noted that lithium hydroxide reacts only slowly with hot water. On the other hand, cesium amide explodes on contact with ice-cold water. Reaction energies (gram heats of solution) vary with the cation according to the general rule Li>Na>K>Rb>Cs. Reaction energies vary with the anion according to the general rule $(NH_2)>(O)>(OCH_3)>OH$. These rules are not without exception and for mixed anions and cations (e.g. comparing heat of solution of $NaOCH_3$ with $Rb_2O$) there is no simple rule.

Rates of reaction (generally more important that heats in determining thermochemical usefulness) vary with the cations according to the general rule Cs>Rb>K>Na>Li and with the anions according to the general rule $(NH_2)>(O)>(OCH_3)>OH$. Again, there is no simple relation for mixed anions and cations.

It has been found that virtually any rate of reaction, from gradual dissolution of powder in warm water to outright detonation of a large monolithic piece in ice-cold water can be achieved in a more or less continuous spectrum using mixtures of the compounds of the invention.

Certain preferred embodiments of the invention are illustrated by the following examples. These examples define various melting agents, together with their properties and uses.

EXAMPLE 1

Composition: 100% sodium monoxide ($Na_2O$)

Properties: This material is friable and fractures and crumbles easily. However, it is a highly effective ice melter. It initiates melting down to temperatures of $-20°$ C., with penetration rates of about 0.2 cm/sec. The material boils the surrounding melt water violently as it progresses through ice while giving good melting efficiency.

Uses: Sodium monoxide can be used for rapidly penetrating ice and snow for orienting (righting) an elongated penetrator on bare or snow-covered ice, and for establishing acoustic contact between a payload and ice.

EXAMPLE 2

Composition: 75% sodium monoxide ($Na_2O$), 25% sodium amide ($NaNH_2$)

Properties: The material is nonfriable and has excellent mechanical properties. Its ice melting properties contrast with those of both its constituents. Pure sodium monoxide can only be compacted to high density using a hard to achieve combination of temperature and pressure. Pure sodium amide can readily be fused but cannot be used for penetrating ice. It is much too reactive with water and quickly liquifies under the heat of reaction. The liquid material then floats in water and rises to the top of the hole in the ice where upon it bursts into flame and/or explodes. Melting efficiencies achieved with sodium amide alone are low and the material is dangerous. The 75% $Na_2O$ and 25% $NaNH_2$ mixture does not liquify, burn or explode as it penetrates ice. However, it remains extraordinarily reactive and can advance at speeds up to 1 cm/sec. Melting efficiencies are excellent, and are comparable with many much slower penetrating thermochemicals (there tends to be a trade-off; high efficiency correlates with low penetration rate and vice versa).

Uses: This material can be used for deep vertical ice penetration where high speed (0.5 cm/sec. or greater) is important. It can also be used for a high speed penetrator righting charge and for snow-penetration/acoustic-contact. The material works more effectively on ice than it does on snow.

EXAMPLE 3

Composition: 50% sodium monoxide ($Na_2O$), 50% potassium methoxide ($KOCH_3$).

Properties: This material has good mechanical properties and is highly fracture resistant. Its ice melting properties are similar to those of pure $Na_2O$, except that the mixture reacts much more gently with water/ice while still achieving an excellent rate of penetration. Unlike pure $Na_2O$, the binary composition will not incandesce or emit sparks upon contact with steam or a small amount of water. As the material dissolves, methanol is released into the meltwater which allows the meltwater to boil at a temperature of about 70° C. This low-temperature boiling aids in causing rapid dissolution of the thermochemical charge and efficient transfer of heat to the surrounding ice. The methanol also acts as a freezing point depressant, allowing the binary composition to start reacting with ice (initiate) at a temperature of about 10° colder than can pure $Na_2O$.

Uses: The $Na_2O$-$KOCH_3$ composition is excellent for penetrating snow and is satisfactory as an ice melting initiator at Arctic temperatures. The material is well suited for use as a righting charge for an ice penetrator and is useful for establishing acoustic contact between a sensor package and ice. The relatively low heat of solution of the mixture mitigates against its use as a deep ice-penetration charge.

EXAMPLE 4

Composition: 70% potassium hydroxide (KOH), 30% potassium monoxide ($K_2O$)

Properties: This material is nonfriable and has good mechanical properties. It is highly soluble in cold water and has moderate to good low temperature initiation properties. The mixture dissolves rapidly in a melthole, yielding a boiling reaction which quickly and efficiently penetrates ice.

The individual components of this composition, on the other hand, are not satisfactory ice melters by themselves. Potassium hydroxide alone will melt ice, even at temperatures as low as $-40°$ C. but it cannot generate enough heat to sustain a fast reaction and ice penetration is correspondingly unacceptably slow. Pure potassium monoxide reacts too rapidly with water to be usable for ice penetration. The $K_2O$ penetrates ice inefficiently with the majority of its energy being lost in rapid steam formation.

Uses: The KOH-$K_2O$ composition is useful for melting snow or ice at temperatures down to $-40°$ C. It is an effective low temperature initiation material. The composition is highly effective for penetrating snow and can be used to penetrate snow and ice for purposes of establishing acoustic contact between a payload and the underlying ice. The mixture can be used as a righting charge for ice penetrators.

EXAMPLE 5

Composition: 80% potassium monoxide ($K_2O$), 10% sodium hydroxide (NaOH), 10% lithium monoxide ($Li_2O$).

Properties: The material is nonfriable, fracture resistant and has good mechanical properties. Its behaviour upon contact with ice is similar to that of pure sodium monoxide (Example 1). It has the advantages, however, of being more effective in penetrating snow and of initiating reactions at much lower temperatures, down to $-50°$ C. The heat of solution of this composition is similar to that of pure $Na_2O$ and is much higher than that of the KOH-$K_2O$ mixture given as Example 4 above. The principal role of the NaOH in the composition is as a fusible binder for the other two powders. In addition, the NaOH helps moderate the inherently high reaction rate of the $K_2O$. The purpose of the $Li_2O$ is entirely as a reaction rate modifier. It slows the otherwise excessive rate of dissolution of the composition while somewhat increasing the overall heat of solution.

Uses: The $K_2O$-NaOH-$Li_2O$ composition is useful for melting snow or ice at temperatures down to $-50°$ C. It is effective for low temperature initiation, ice penetration, snow penetration, penetrator righting and acoustic coupling applications.

EXAMPLE 6

Composition: 80% cesium hydroxide (CsOH), 20% cesium amide ($CsNH_2$)

Properties: This material is non-friable and has good mechanical properties. It is highly soluble in water and is a powerful freezing point depressant. Cesium hydroxide alone is an effective thermochemical but melts ice too slowly for most applications. Cesium amide is too reactive to be used as an efficient ice melting thermochemical. The combination provides good melting rate and efficiency.

Uses: This material is well suited for use as an ice penetrator righting charge since its high density (about 3.5 g/cm3) gives it excellent ballasting action. The material is a very effective low temperature initiator and can penetrate dry snow and ice at temperatures of $-60°$ C. The composition can be used as a fast snow penetration charge for purposes of bringing a payload into acoustic contact with ice.

While the present invention has been depicted and described with reference to multiple preferred embodiments thereof, such reference does not imply a limitation upon the invention, and none is to be inferred. The invention is intended to be limited only by the scope and spirit of the appended claims, and range of equivalents thereto, which also provide a definition and disclosure of the invention.

I claim:

1. A melting agent for melting ice comprising a mixture of at least two compounds selected from the group consisting of lithium hydroxide, lithium monoxide, lithium methoxide, lithium amide, sodium hydroxide, sodium monoxide, sodium methoxide, sodium amide, potassium hydroxide, potassium monoxide, potassium methoxide, potassium amide, rubidium hydroxide, rubidium monoxide, rubidium methoxide, rubidium amide, cesium hydroxide, cesium monoxide, cesium methoxide and cesium amide, said melting agent being in solid, anhydrous, water-soluble form, with the compounds and proportions thereof in the melting agent being selected to rapidly generate heat at a controlled rate through dissolution of the melting agent when directly contacting ice.

2. A melting agent according to claim 1 comprising a blended and compacted mixture of at least two of said compounds.

3. A melting agent according to claim 1 comprising a fused mixture of at least two of said compounds.

4. A melting agent according to claim 1 comprising a mixture of sodium monoxide and sodium amide.

5. A melting agent according to claim 1 comprising a mixture of sodium monoxide and potassium methoxide.

6. A melting agent according to claim 1 comprising a mixture of potassium hydroxide and potassium monoxide.

7. A melting agent according to claim 1 comprising a mixture of potassium monoxide, sodium hydroxide and lithium monoxide.

8. A melting agent according to claim 1 comprising a mixture of cesium hydroxide and cesium amide.

9. A melting agent according to claim 1 comprising part of a device for acoustically or mechanically coupling with an ice surface, said melting agent being adapted to melt a depression in the surface of the ice and form a melt water pool therein.

10. A melting agent according to claim 1 comprising part of an aerially deployed ice penetrator package and being in the form of a block of dense, fast melting thermochemical adapted to rapidly melt ice under the front end of the penetrator package to form a crater in the ice, into which the penetrator package tilts into a substantially vertical orientation.

11. A method for melting ice which comprises directly contacting the ice to be melted with a melting agent comprising a solid, anhydrous mixture of at least two compounds selected from the group consisting of lithium hydroxide, lithium monoxide, lithium methoxide, lithium amide, sodium hydroxide, sodium monoxide, sodium methoxide, sodium amide, potassium hydroxide, potassium monoxide, potassium methoxide, potassium amide rubidium hydroxide, rubidium monoxide, rubidium methoxide, rubidium amide, cesium hydroxide, cesium monoxide, cesium methoxide and cesium amide and melting the ice by rapidly generating heat at a controlled rate through dissolution of the melting agent while directly contacting the ice.

12. A method according to claim 11 wherein the compounds forming the mixture and the proportions thereof are selected to provide a rapid generation of heat at a controlled rate through dissolution of the melting agent when directly contacted with ice.

13. A method according to claim 12 wherein the ice is selected from solid ice, broken ice, crushed ice, snow and frozen soil in which frozen water is a significant component.

14. A method according to claim 12 wherein the melting agent is prepared by blending and compacting at least two of said compounds.

15. A method according to claim 12 wherein the melting agent is prepared by mixing together and fusing at least two of said compounds.

16. A method according to claim 12 wherein the melting agent comprises a mixture of sodium monoxide and sodium amide.

17. A method according to claim 12 wherein the melting agent comprises a mixture of sodium monoxide and potassium methoxide.

18. A method according to claim 12 wherein the melting agent comprises a mixture of potassium hydroxide and potassium monoxide.

19. A method according to claim 12 wherein the melting agent comprises a mixture of potassium monoxide, sodium hydroxide and lithium monoxide.

20. A method according to claim 12 wherein the melting agent comprises a mixture of cesium hydroxide and cesium amide.

21. A method according to claim 12 wherein said melting agent is in contact with ice far below the freezing point of water to initiate a melting reaction and form a meltwater pool.

22. A method according to claim 12 wherein said melting agent forms a hole in ice by sinking into a meltwater pool as melting proceeds.

23. A method according to claim 12 wherein said melting agent penetrates snow by direct contact between the melting agent and the snow.

24. A method according to claim 12 wherein said melting agent is used with a device for acoustically or mechanically coupling with an ice surface, said melting agent serving to melt a depression in the surface of the ice and form a meltwater pool therein.

25. A method according to claim 12 wherein said melting agent is part of an aerially deployed ice penetrator package and includes a block of dense, fast-melting thermochemical which rapidly melts ice under the front end of the penetrator package to form a crater in the ice into which the penetrator package tilts into a substantially vertical orientation.

26. A method for melting ice which comprises directly contacting the ice to be melted with a melting agent comprising a single compound selected from the group consisting of sodium hydroxide, sodium monoxide, sodium methoxide, sodium amide, potassium hydroxide, potassium monoxide, potassium methoxide, potassium amide, rubidium hydroxide, rubidium monoxide, rubidium methoxide, rubidium amide, cesium hydroxide, cesium monoxide and cesium methoxide, thereby melting the ice by rapidly generating heat at a controlled rate through dissolution of the melting agent while directly contacting the ice.

27. A method according to claim 26 wherein the melting agent is selected from the group consisting of sodium monoxide, sodium methoxide, sodium amide, potassium hydroxide, potassium monoxide, potassium methoxide, potassium amide, rubidium hydroxide, rubidium monoxide, rubidium methoxide, rubidium amide, cesium hydroxide, cesium monoxide and cesium methoxide.

28. A method according to claim 26 wherein the melting agent comprises sodium monoxide.

29. A method according to claim 26 wherein said melting agent is in contact with ice far below the freezing point of water to initiate a melting reaction and form a meltwater pool.

30. A method according to claim 26 wherein said melting agent forms a hole in ice by sinking into a meltwater pool as melting proceeds.

31. A method according to claim 26 wherein said melting agent penetrates snow by direct contact between the melting agent and the snow.

32. A method according to claim 26 wherein said melting agent is used with a device for acoustically or mechanically coupling with an ice surface, said melting agent serving to melt a depression in the surface of the ice and form a meltwater pool therein.

33. A method according to claim 26 wherein said melting agent is part of an aerially deployed ice penetrator package and includes a block of dense fast melting thermochemical which rapidly melts ice under the front end of the penetrator package to form a crater in the ice into which the penetrator package tilts into a substantially vertical orientation.

* * * * *